(12) United States Patent
Brudeli et al.

(10) Patent No.: US 10,844,912 B2
(45) Date of Patent: Nov. 24, 2020

(54) REDUCED VIBRATION CLUTCH ACTUATOR

(71) Applicant: KONGSBERG AUTOMOTIVE AS, Kongsberg (NO)

(72) Inventors: Geir Brudeli, Hokksund (NO); Daniel Norheim, Kongsberg (NO); Stein-Erik Arne, Førenskog (NO)

(73) Assignee: KONGSBERG AUTOMOTIVE AS, Kongsberg (NO)

( * ) Notice: Subject to any disclaimer, the term of this patent is extended or adjusted under 35 U.S.C. 154(b) by 202 days.

(21) Appl. No.: 16/072,609

(22) PCT Filed: Jan. 25, 2017

(86) PCT No.: PCT/EP2017/051500
§ 371 (c)(1),
(2) Date: Jul. 25, 2018

(87) PCT Pub. No.: WO2017/129595
PCT Pub. Date: Aug. 3, 2017

(65) Prior Publication Data
US 2019/0040919 A1    Feb. 7, 2019

(30) Foreign Application Priority Data

Jan. 25, 2016 (SE) ..................... 1650083

(51) Int. Cl.
*F16D 28/00*  (2006.01)
*F16D 48/06*  (2006.01)
(Continued)

(52) U.S. Cl.
CPC .............. *F16D 28/00* (2013.01); *F16D 23/12* (2013.01); *F16D 25/083* (2013.01); *F16D 48/064* (2013.01); *F16D 2023/123* (2013.01)

(58) Field of Classification Search
CPC ...... F16D 28/00; F16D 25/083; F16D 25/126; F16D 13/752; F16D 48/06; F16D 48/064;
(Continued)

(56) References Cited

U.S. PATENT DOCUMENTS 5,788,008 A * 8/1998 Fort ........................ F16D 28/00
                                                           180/247
5,788,088 A    8/1998 Kao
(Continued)

FOREIGN PATENT DOCUMENTS

DE      19835574 A1    2/2000
GB        901224 A     7/1962
(Continued)

OTHER PUBLICATIONS

English language abstract for DE19835574A1 extracted from espacenet.com database on Oct. 25, 2018, 2 pages.
(Continued)

*Primary Examiner* — Richard M Lorence
(74) *Attorney, Agent, or Firm* — Howard & Howard Attorneys PLLC (57) ABSTRACT

A clutch actuator (1) has a preload plunger able to move a clutch actuating pushrod (49) wherein the preload plunger (19) is able to be preloaded by a preload spring (21) arranged between the preload plunger and a movable body (17). The clutch actuator is adapted to be operated such that during use when the clutch is engaged there is a force-reducing gap (61) of width (x5) between the movable body and the preload plunger. Control means for controlling such a clutch actuator are also disclosed.

17 Claims, 5 Drawing Sheets

(51) Int. Cl.
*F16D 23/12* (2006.01)
*F16D 25/08* (2006.01)

(58) Field of Classification Search
CPC ............ F16D 48/08; F16D 2500/1023; F16D 2500/1025; F16D 2500/50233; F16D 23/12; F16D 2023/123
See application file for complete search history.

(56) References Cited

U.S. PATENT DOCUMENTS

| | | |
|---|---|---|
| 6,234,290 B1 | 5/2001 | Drexl et al. |
| 7,197,955 B2 * | 4/2007 | Sharma ................. F16H 63/304 |
| | | 310/75 R |
| 7,211,971 B2 * | 5/2007 | Evans ...................... H02K 7/06 |
| | | 180/338 |
| 2006/0032721 A1 * | 2/2006 | Langwald ............... F16D 28/00 |
| | | 192/84.6 |
| 2016/0273595 A1 | 9/2016 | Shioiri et al. |

FOREIGN PATENT DOCUMENTS

| | | |
|---|---|---|
| GB | 2173567 A | 10/1986 |
| WO | 2012119612 A1 | 9/2012 |

OTHER PUBLICATIONS

International Search Report for Application No. PCT/EP2017/051500 dated May 10, 2017, 2 pages.

* cited by examiner

REDUCED VIBRATION CLUTCH ACTUATOR

The subject application is the National Stage of International Patent Application No. PCT/EP2017/051500, filed on Jan. 25, 2017, which claims priority to Swedish Patent Application No. SE 1650083-7, filed on Jan. 25, 2016, the contents of which are incorporated herein by reference in their entirety.

BACKGROUND OF THE INVENTION

The present invention relates to an actuator for operating a clutch. The clutch may be a vehicle clutch. The clutch actuator has an actuator unit with a movable body which controls the movement of a clutch operating unit such as a pushrod or lever or the like slideably or rotatably mounted for movement in a direction in which the it can act on a clutch release bearing (also known as the thrust bearing) arranged to move the clutch from its normal rest or fully engaged position in which power may be transmitted from an engine to a transmission to the activated or disengaged position in which power can no longer be transmitted between the engine and the transmission.

It is known to provide a preload on the release bearing. The release bearing is usually a ball bearing and a preload is necessary to keep the bearing stable during use. Too low a preload may lead to wear and instability in the bearing while too high a preload may lead to damage of the release bearing and/or the diaphragm spring fingers of the clutch and/or premature wearing out of the clutch. Such a preload is normally provided by a metal spring arranged somewhere in the clutch operating system. Typical clutch preload forces for a passenger vehicle are in the range of 80-150 N; for larger vehicles it could be several hundred Newtons.

As the friction material on a clutch plate wears the clutch plate becomes thinner, and for a conventionally operated car or lorry clutch this means that the fingers of the diaphragm spring of the clutch move towards the release bearing. This pushes the release bearing back towards the clutch operating unit (e.g. a pushrod) and self-adjustment means are provided to allow the pushrod to move a similar amount in order to maintain a constant clutch operating setup during the life of the clutch. Typically the spring constant Kc of the diaphragm spring is around 300-500 N/mm for a passenger vehicle and can be higher for larger vehicles. The maximum force required to disengage a clutch is typically within the range of 3000N to 13000N.

Hydraulically-, pneumatically- or electrically-operated linear actuators are known, for example from WO2012119612, which have self-adjusting means for keeping the clutch operating unit in the form of a pushrod in contact with the thrust bearing with a low dead volume during the life of the clutch. Such systems comprise a piston which is in constant mechanical contact with the pushrod. During use the gearbox and clutch may move slightly in relationship to each other and forces are transmitted via diaphragm spring to the clutch release bearing to the clutch operating unit (e.g. a push rod) and then to the clutch actuator. With a spring constant Kc of 300-500 N/mm a movement of 1 mm will cause a load of 300-500 N on the pushrod and the clutch actuator. Continued exposure to such transient loads and the damage they may cause to the motor, bearings and moving parts of the clutch actuator has to be accounted for when designing the system and may lead to dimensioning of components which are larger and heavier than would be necessary in the absence of such transient loads. If the loads are not taken into account when designing the system it may fall prematurely.

BRIEF DESCRIPTION OF THE INVENTION

The present invention relates to a clutch actuator for a clutch operating system wherein the actuator, when the clutch is engaged, is adapted to reduce the transmission of unwanted forces to the motor or reduction gear from the clutch operating unit which is intended to be in contact with the clutch or release bearing. This is achieved by providing a clutch operating plunger or the like which is not in direct contact with the actuator unit of a clutch actuator when the clutch is fully engaged. Instead the contact between clutch operating plunger and actuator unit when the clutch is engaged is via a spring with a low spring constant.

The invention further includes a method for reducing the transmission of forces through a clutch operating system when the clutch is engaged. The invention also includes control means for performing the method.

DETAILED DESCRIPTION OF THE INVENTION

Shown schematically in FIGS. 1-3 and 5 is a clutch actuator 1 in accordance with an embodiment of the present invention for operating a clutch, which may be a vehicle clutch. The clutch actuator comprises a torque producing motor 3 which is this example is an electrical motor but which may be any type of motor for example pneumatic or hydraulic. The output shaft 5 of the motor 3 is connected to, and arranged to drive, the input 7 of a reduction gear 9, shown here as a planetary gear. A brake means such as return brake 10 may be connected to the reduction gear and/or motor to reduce the braking forces that need to be generated by the motor. The output shaft 11 of the reduction gear is connected to the input of an actuator unit 13. Actuator unit 13 has a stationary support, illustrated here as a ball screw 15 of outer diameter Db, the rotation of which can drive a movable body, e.g. ball nut 17 linearly along it. A clutch preload plunger 19 with a proximal spring-receiving surface 31 with outer diameter Dp is mounted centrically on the ball screw and is able to translate freely along the ball screw. A helical preload spring 21 with an inner diameter between the coils ds which is greater than the outer diameter Dn of the ball nut is mounted centrically around the ball screw and ball nut. The preload spring has a low spring constant Kp (also called "spring rate") which is preferably equal to or less than 10% of the spring constant of the diaphragm spring of the clutch which it is intended to be used with, for example a spring constant equal to or less than 50 N/mm. More preferably the preload spring has a low spring constant which is equal to or less than 2% of the spring constant of the diaphragm spring of the clutch which it is intended to be used with, for example a spring constant equal to or less than 10 N/mm. Even more preferably the preload spring has a low spring constant which is equal to or less than 1% of the spring constant of the diaphragm spring of the clutch which it is intended to be used with, for example equal to or less than 5 N/mm for a passenger vehicle. Most preferably the spring constant of the preload spring is equal to or less than 3 N/mm and equal to or greater than 1 N/mm for a passenger vehicle. In this embodiment of the invention the proximal end 23 of the preload spring 21 is attached by a spring holder 25 to or near the proximal end 27 of the ball nut and the distal end 29 of the preload spring is attached to or pushes on the proximal spring-receiving surface 31 of the preload plunger, thereby exerting a force on the preload plunger which pushes the preload plunger towards the distal end 33 of the ball screw. As helical springs are not usually designed to be used in the fully compressed state for any length of time, preferable the length of a helical preload spring is chosen so that when it has been compressed the distance required to exert the necessary preload on the preload plunger it is not completely compressed while at the same time the distal end of the ball nut is brought into contact with the proximal end of the preload plunger. When the actuator unit is attached to a vehicle then the actual position of the preload plunger when the clutch is engaged will depend in the tolerances in the clutch and clutch operating mechanism which may be of the order of 15 mm and the maximum possible wear in the clutch pressure plate and operating mechanism which could be of the order of 25 mm. In order to allow for these tolerances and wear and the nominal movement (which may be of the order of, for example, 25 mm) of the clutch operating unit (e.g. pushrod) when moving from when the clutch is fully engaged to when the clutch is fully disengaged the system may be designed so that when fitted to a vehicle with a new clutch the nominal position of the proximal end of the preload plunger is a midway position which is between the fully reversed and fully forward positions, e.g. 4 cm from the each of those positions. In order to reduce the travel of the ball nut required to achieve the desired preload on the clutch thrust bearing the preload spring is partly compressed when it is fitted between the preload plunger and the fully reversed ball nut when initially fitted to a vehicle. For example, when the actuator unit ball nut has a stroke (i.e. the maximum distance that it can travel along the ball screw) of 8 cm from its fully reversed position (i.e. proximal to the motor position) to its fully forward position (i.e. distal position) then, if the ball nut is 3 cm long and the preload spring is mounted 0.2 cm from the proximal end of the ball nut, the total length of the spring when the ball nut is in the fully reversed position and the preload plunger is in the midway position is 6.8 cm. If the spring constant of the preload spring is linear and is 1.5 N/mm then a spring which is 10.8 cm long when uncompressed and 2 cm long when fully compressed will be compressed 4 cm when fitted between the fully reversed ball nut and the preload plunger, thus providing an initial preload of 60 N.

Figure 1:
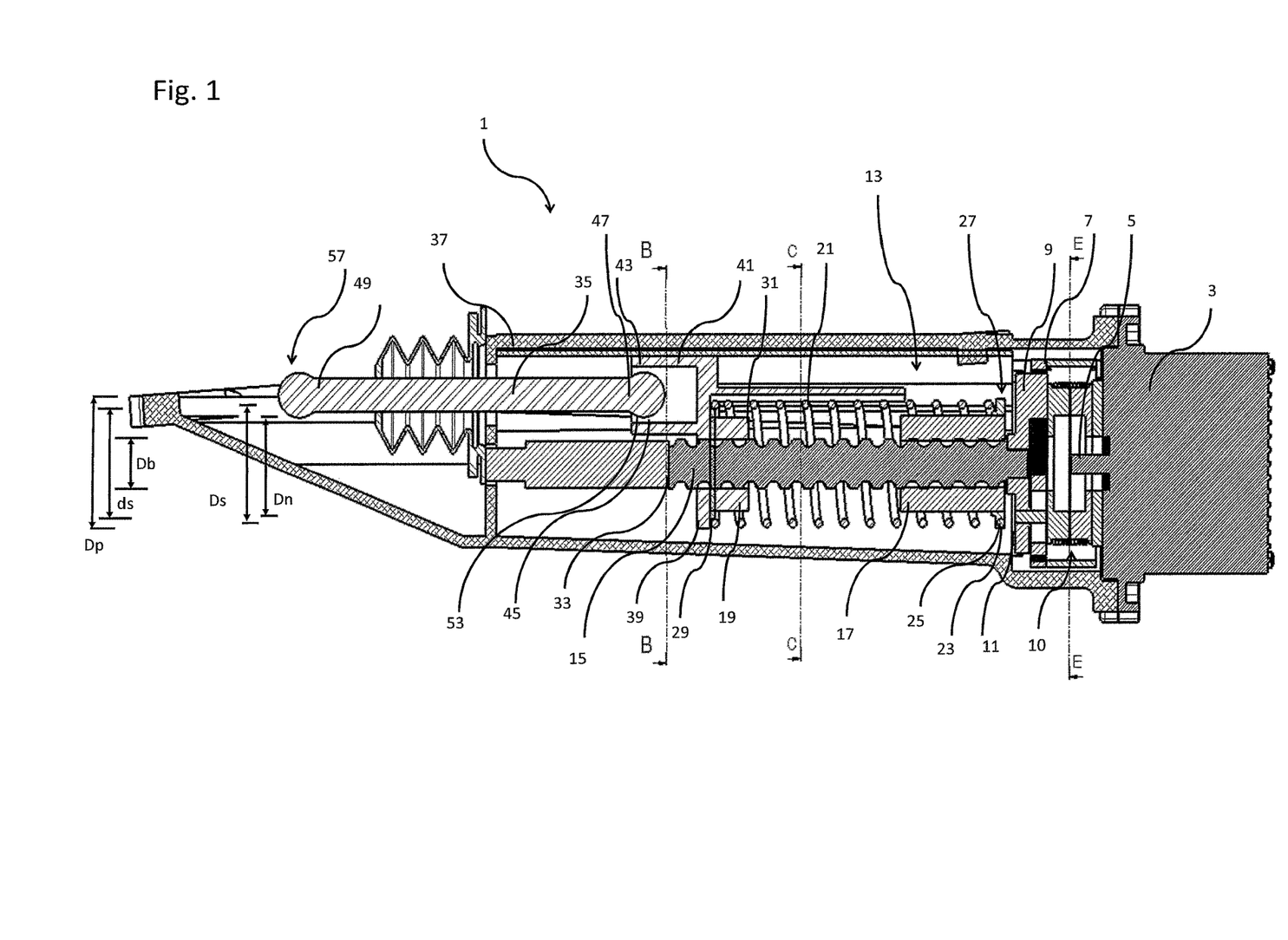
FIG. 1 shows a schematic, sectional view of an embodiment in accordance with the invention of a clutch actuator for operating a vehicle clutch, a clutch operating unit and a dust cover.
Figure 2:
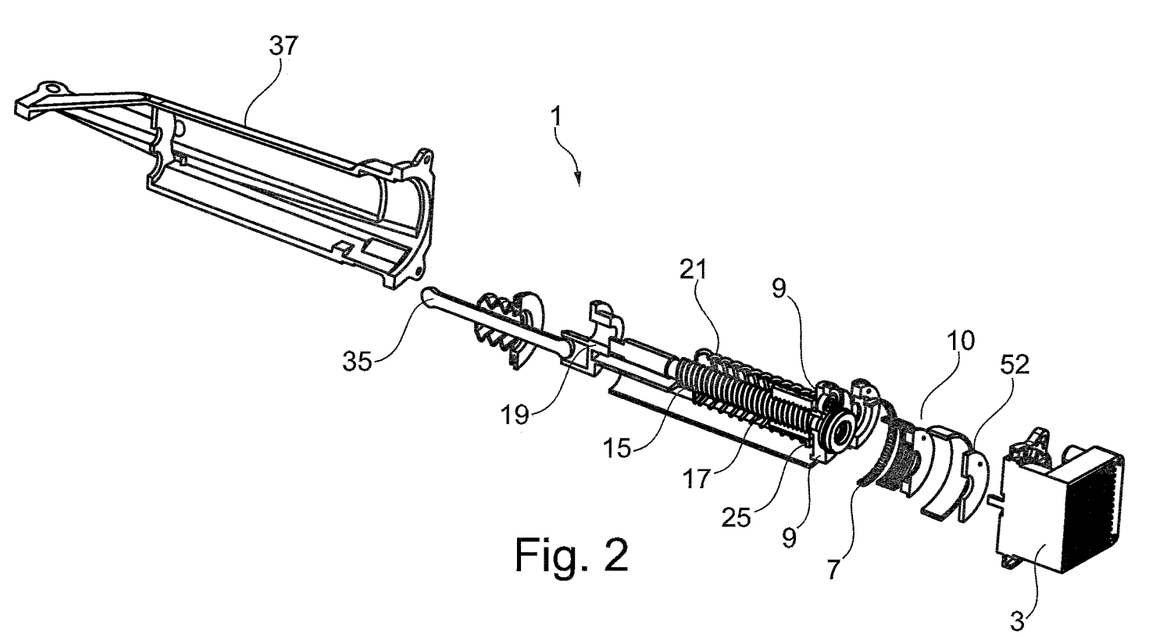
FIG. 2 shows a schematic, perspective exploded view of the clutch actuator of FIG. 1.
Figure 3:
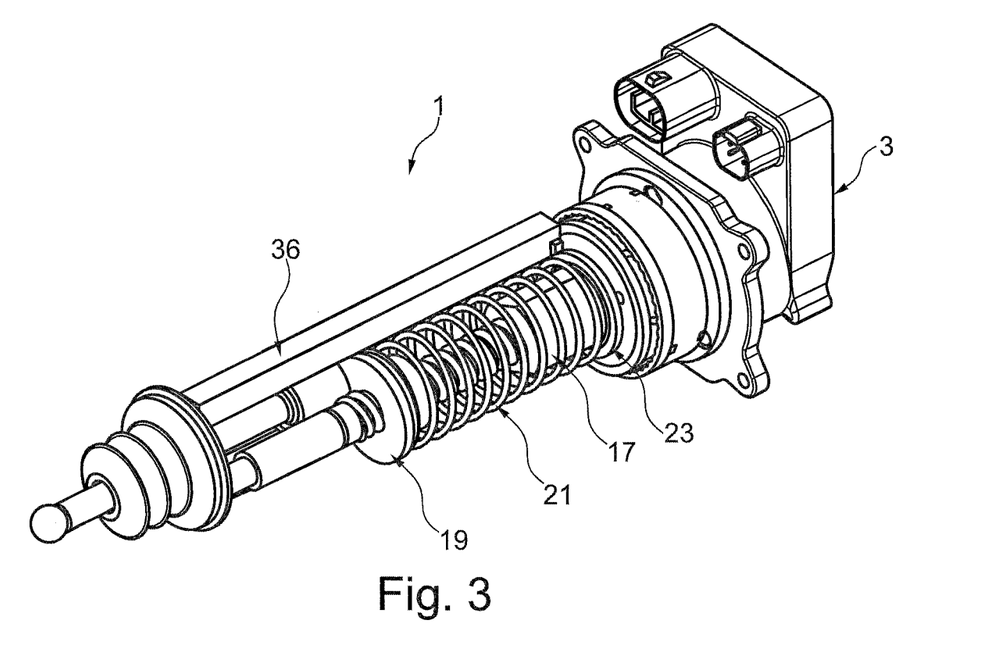
FIG. 3 shows a schematic perspective view of the clutch actuator of FIG. 1.
Figure 4:
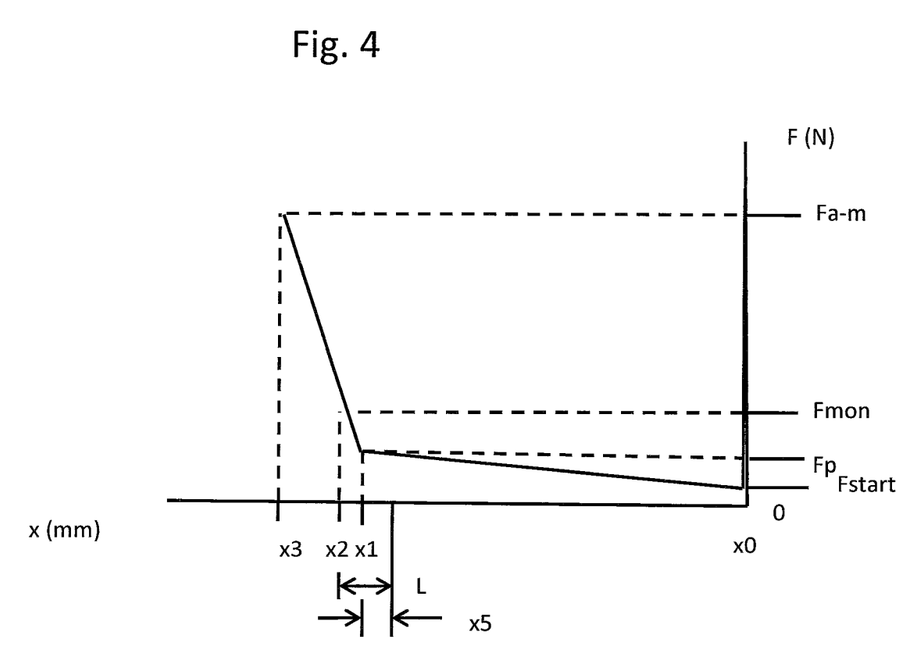
FIG. 4 shows schematically the forces measurable on the movable body of a clutch actuator according to the invention when in use.

As the ball nut is moved towards the preload plunger the preload spring is increasingly compressed between the ball nut and preload plunger thereby generating an increasing preload. When the distal end of the ball nut comes into contact with the proximal end of the preload plunger at the midway position the ball nut will have compressed the spring an additional 4 cm and the preload spring will exert an additional force of 60 N onto the initial preload of 60 N mentioned above, thus generating a total preload of 120 N. At this point the preload spring will have been compressed 8 cm out from its initial length of 10.8 cm and is not fully collapsed. Any further movement of the ball nut towards the preload plunger cannot result in further compression of the spring as the ball nut is in direct contact with the preload plunger.

Other types of spring may also be contemplated which can be used in the fully compressed state for example, one or more or a stack of Belleville washers (which are also known as disk springs).

Other arrangements of the preload spring are also conceivable, for example it may have an inner diameter ds and an outer diameter Ds which both are less than the diameter of the ball nut and in this case it can be positioned between the distal end of the ball nut and the proximal end of the preload plunger. In this case it must be collapsed completely in order for the clutch disengaging force to be transmitted from the ball nut to the preload plunger.

The preload plunger is preferably provided with a longitudinally extending guide arm 35 which is offset from, and parallel with, the central longitudinal axis of the preload plunger and which can cooperate with a guide rail 36 which is attached to the reduction gear (or to an optional housing 37 which can at least partially surround the actuator). The guide rail is arranged parallel to the central longitudinal axis of the ball screw in order to ensure that the preload plunger is maintained parallel to the ball screw as it moves along it. The distal end surface 39 of the preload plunger further comprises a clutch operating unit receiving cup 41 with an open end 43. The cup is offset from the central axis of the preload plunger which reduces the overall length of the clutch actuator. The open end faces away from the preload plunger and the interior of the clutch operating unit receiving cup is provided with gripping means 45 for gripping the proximal end 47 of a clutch operating unit such as a clutch operating pushrod 49. Preferably the gripping means and the proximal end of the clutch pushrod are arranged to allow angular movement of the pushrod, for example as a ball 53 on the end of the pushrod and a corresponding socket (not shown) in the cup.

During use the distal end 57 of the clutch operating unit (pushrod 49) is intended to be in continuous, preferably direct, contact with the conventional release bearing operating arm of a clutch and to exert a preload force onto it when the clutch is engaged and to transfer the clutch operating force from the actuator unit to the release bearing operating arm when the clutch is being disengaged and re-engaged.

Normally a vehicle clutch is biased to the engaged position in which a force transmission path is established from the engine flywheel to the splines of the gearbox input shaft via the clutch driven plate. When the clutch is activated to interrupt the force transmission path, movement of the release bearing towards the flywheel causes the pressure exerted on the driven plate to be reduced until finally no force is transmitted from the flywheel to the clutch driven plate and the clutch is in the dis-engaged position and drive to the gearbox is interrupted. This permits the shifting of transmission gears. The movement of the release bearing is controlled by a release-bearing lever which pivots around a pivot and has one end in contact with the release bearing and the other end in contact with a clutch operating mechanism which is in contact with the pushrod. The clutch operating mechanism can be arranged so that movement, which can be linear or rotary depending on the design of the clutch operating mechanism, of the clutch operating unit in the direction towards the release bearing causes the clutch to become dis-engaged.

When the clutch operating unit is a pushrod, the clutch actuator and its optional housing are preferably attached to a vehicle in a position where the longitudinal axis of the pushrod is substantially aligned with the direction of travel of the clutch release bearing. When the clutch actuator has been fixed to a vehicle with the preload plunger in contact with the pushrod then the pushrod will push the preload plunger towards the proximal end of the ball screw until the force exerted on the preload plunger by the pushrod equals the opposing force exerted on the preload plunger by the preload spring. Control means such as software for controlling the clutch actuator and hardware for running the clutch actuator are provided in a suitable manner. The control means is preferably a program which is able to be run on a control device such as a processor adapted to and provided with any necessary hardware to control the motor 3 of the clutch actuator in accordance with a method of the present invention. When first mounted on a vehicle the movable body such as the ball nut 17 could be fully reversed to its proximal end position which is near to or at the proximal end (i.e. the end nearest the motor) of the stationary support (e.g. ball screw 15). In order to be able to determine the possible travel or stroke available for the ball nut, stroke determining means may be provided to enable the control device to determine the force required to move the ball nut. These could be, e.g. current measuring means attached to the motor drive circuit and/or toque measuring means attached to the motor or reduction gear or the like, and/or force measuring means applied to the ball screw, ball nut, preload plunger or the like.

Once it has been mounted to be able to operate the clutch of, for example, a vehicle, the clutch actuator can be operated by the control device and the software. The software is adapted to control the actuator moment and to receive and act on position and/or current and/or other signals which are necessary to determine the position of the ball nut and/or the forces which are opposing the movement of the ball nut. The software may be adapted to measure the amount of travel available for the ball nut. It may be adapted to measure the travel of the clutch operating mechanism from the fully engaged position to the fully unengaged position. It is adapted to control the actuator to disengage a clutch and it is further adapted to control the position of the ball nut so that when the clutch is engaged the ball nut can be positioned in a position which reduces the amount of force transmitted between the clutch operating unit (e.g. a pushrod) and the clutch actuator (the torque producing motor 3).

The amount of travel available for movement of the ball nut can be calculated using a method with the following step: the motor is operated in the reverse direction so that the ball nut moves towards the proximal end of the ball screw until a high load over a first threshold Fstart is detected. This implies that the ball nut has reached the end of its rearward travel (the proximal end position) and that the current position of the ball nut is the start position x0 for any forward travel. The motor is now operated in the forward direction. To begin with the movement of the ball nut is at first only opposed by friction in the system, the initial preload applied to the preload plunger (for example the nominal 60 N mentioned in the example above) and any force opposing its movement that is generated by the further compression of the preload spring. During this travel the preload spring pushes on the preload plunger, the movement of which is opposed by the pushrod which is in contact with the clutch operating mechanism. Further movement of the ball nut can then only take place by compressing the preload spring, which causes the force opposing the ball screw to rise with a force which depends on the spring constant of the preload spring and the distance it is compressed. This the initial, low ball nut opposing force increases as the preload spring is compressed. The specification of a preload force for a thrust bearing always is given as nominal value, e.g. 120 N, and a tolerance, for example plus or minus 20 N. In order to ensure that the lower limit is always surpassed the length of the preload spring and its spring constant are chosen so that the nominal preload force Fp (for example 120 N in the example mentioned above for a passenger vehicle clutch) should normally be reached or exceeded when the distal face of the ball nut comes into direct contact with the proximal face of the preload plunger and preferably, especially in the case of a helical spring, before the spring is fully compressed. The position of the ball nut when this contact occurs and this nominal preload force of about 120 N is reached or surpassed may be recorded as x1. Further movement of the ball nut will only occur if the clutch operating unit, i.e. the pushrod, can move the clutch operating mechanism. Thus any further movement of the ball nut is opposed by the force exerted on the pushrod by the clutch operating mechanism which has a spring constant which is much higher than that of the preload spring (for example 300-500 N/mm) and the opposing force will rise steeply as the ball nut has to overcome the forces in the clutch operating system in order to cause the preload plunger, pushrod and release bearing to start to move towards the clutch disengaging position. This position can be identified by monitoring for a predetermined force Fmon (which, for example, may be set at two or more times the nominal preload force) that is chosen to be sufficiently high enough that it is easy to distinguish it from the preload on the preload plunger but sufficiently low that the expected distance travelled by the ball nut from the position x1 is of the order of millimeters, preferably two millimeter or less and more preferably one millimeter or less. The position of the ball nut at the point where the force Fmon is measured is recorded as x2. This position can be measured by a linear position sensor or the like, or by counting the number of revolutions of the ball screw wherein, as the pitch of the ball screw is known, the software can then calculate the position of the ball nut. In a system in which the clutch operating mechanism has a spring constant of 300-500 N/m then the distance between x1 and x2 will be normally be of the order of 1 mm. Further movement will cause the force to continue to rise as the clutch becomes more and more disengaged; reaching a maximum Fa-m when the release bearing has reached the end of its travel, the clutch is fully dis-engaged and thus any further movement of the ball nut is blocked. The position of the ball nut at this point may be recorded as x3. The distance $\Delta$x3-0 between x3 and x0 is the initial total possible travel of the movable body, e.g. the ball nut, in the actual vehicle. The distance $\Delta$x3-2 between x3 and x2 is the travel of the clutch operating mechanism between engaged and disengaged clutch positions. The position x2 can be considered to be the start position where movement of the diaphragm spring fingers has begun and disengagement of the clutch has begun. This position depends on the state of wear of the clutch and will move towards the proximal end of the ball screw, i.e. the position x0, as the clutch wears and the inner ends of the fingers of the clutch spring move away from the clutch pressure plate. If the clutch wears so much that position x2 coincides with x0 then it will not be possible to provide any further compensation for the clutch wear and ultimately, following further wear, the clutch will start to slip under load when engaged as the clutch spring will be unable to press the clutch plate against the flywheel with enough force to prevent slippage.

This method for determining the travel of the ball nut, the travel of the clutch operating mechanism and the start position where disengagement of the clutch begins can be repeated during the use of the vehicle in order to allow compensation for the wear of the clutch friction plate and other wear in the clutch operating mechanism. Such compensation is provided without the need for any mechanical self-adjustment mechanism and thereby simplifies the construction and reduces the cost of a clutch system using a clutch actuator operated in accordance with the present invention.

If during operation of the vehicle a movable body (e.g. a ball nut) is maintained in contact with the preload plunger by the stationary support (e.g. a ball screw) then forces generated in the clutch operating system by movement of the clutch towards and away from the pushrod which will be of the order of the spring constant of the clutch operating mechanism, i.e. 300-500 N per millimeter of travel, and will be transmitted into the clutch actuator via the preload spring and the ball nut. As the ball nut is solid and is pressed against the preload plunger by the ball screw these forces transmitted through it will not be attenuated much, if at all, and these potentially damaging forces will be transmitted to the ball nut and ball screw and to the actuator gearbox and/or torque producing motor.

Figure 5A:
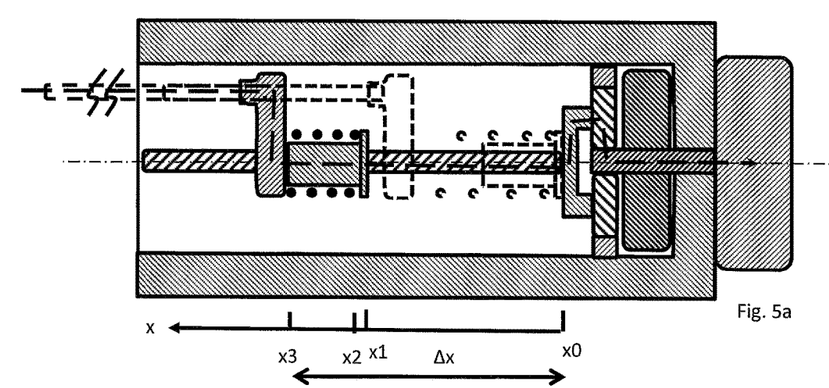
FIG. 5a) shows a schematic view of a clutch actuator according to the invention in two positions—the first, in solid lines, where a clutch would be engaged and the second, in small dashed lines, where the ball nut is in the fully reversed position.
Figure 5B:
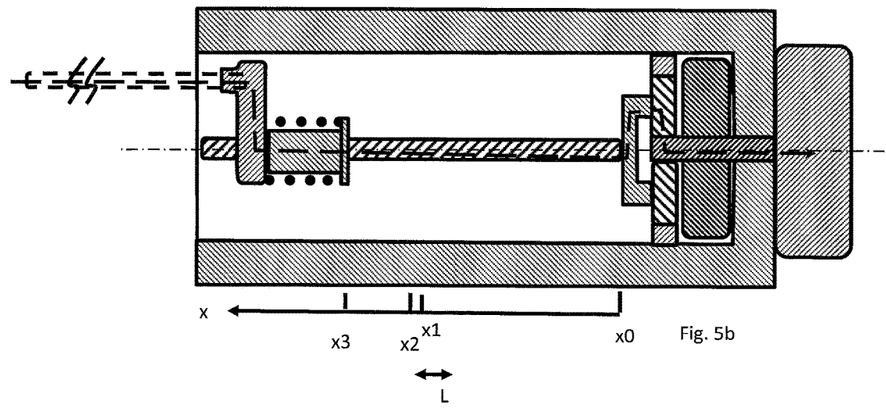
FIG. 5b) shows the clutch actuator of FIG. 5a) in the clutch dis-engaged position.
Figure 5C:
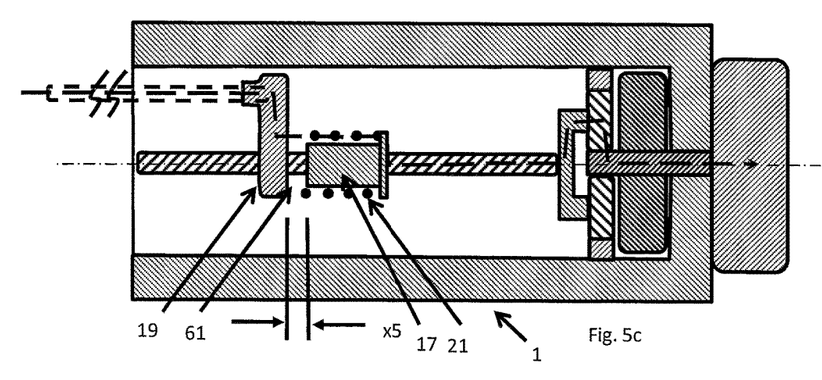
FIG. 5c) shows the clutch actuator of FIG. 5c) in the clutch engaged and ball nut in a force reducing position

In order to prevent this transmission of these potentially damaging forces, in one embodiment of the invention the operating software for the clutch actuator is provided with steps so that when it detects that the clutch is to be re-engaged from the disengaged position, it controls the motor of the actuator so that once the ball nut has been screwed in the reverse direction and returned to position x2 where the actual force exerted on the clutch thrust bearing is greater than the required nominal preload by a predetermined amount (e.g. it is equal to twice or to more than twice the required preload) the motor continues to drive the ball screw until it has move away from the preload plunger a distance L which leaves a force-reducing gap 61 (i.e a gap between two or more components which prevents the direct transmission of force, or reduces the amount of force transmitted, between the components on either side of the gap) of width x5 between the mutually-facing surfaces of the ball nut and the preload plunger. In a first embodiment of software for a clutch actuator the width x5 of the force-reducing gap is controlled by the software to be a predetermined distance which is equal to or greater than 0.5 mm and equal to or less than 5 mm. More preferably the width x5 of force-reducing gap 61 is equal to or greater than 0.75 mm and equal to or less than 2.5 mm. Most preferably width x5 is equal to or greater than 1 mm and equal to or less than 2 mm. With a preload spring with a spring constant of 1.5 N/mm then even with a gap of 5 mm the actual preload of 112.5 N (instead of the nominal preload of 120 Nm) will still be within the designed working tolerances and the system will be able to absorb large movements (up to 5 mm) between the clutch and gearbox before transmitting any large forces between the pushrod and ball nut. However the travel of the ball nut required to operate the clutch will be increased by these 5 mm and will increase the clutch operating time. Having a smaller gap of just 0.5 mm will reduce the clutch operating time but will only permit the system to absorb small movements (up to 0.5 mm) between the clutch and gearbox before transmitting any large forces between the pushrod and ball nut.

In order to take account of measurement tolerances, friction, backlash and wear in the system, in a preferred embodiment of the present invention the software sets the gap of width x5 between the mutually-facing surfaces of the ball nut and the preload plunger by, when the clutch is being disengaged, performing the following steps:

determining the position x2 of the ball nut where the force on the ball nut is over a threshold which preferably is equal to or greater than two times the nominal preload force, for example three times the nominal preload force i.e. 360 N, which corresponds to a distance of 240/300 mm (=0.8 cm) from the clutch engaged position x1 if the spring constant of the clutch operating mechanism is 300 N/mm, or 240/500 mm (=0.48 mm) from the clutch engaged position x1 if the spring constant of the clutch operating mechanism is 500 N/mm; and, after re-engaging the clutch reversing the ball nut past the position x2 by a force reducing distance L which is greater than the distance between x2 and x1 (i.e. greater than the distance x2–x1) and preferably is equal to or greater than 2 mm and less than or equal to 5 mm.

This means that during the return travel the ball nut will be moved to a position in which it is no longer in contact with the preload plunger so that there will be a force-reducing gap x5 (which equals L–(x2–x1)) between the distal end of the ball nut and the proximal end of the preload plunger which will be around 1 mm (and not more than about 4 mm) and that the preload spring will exert a preload on the preload plunger which is within the tolerance of the nominal desired preload force—the reduction in preload force caused by the gap will only be 1.5 N per mm and thus if the actual preload obtained when the ball nut is in contact with the preload plunger is 120 N then with a preload spring constant of 1.5 N/mm the preload obtained with a gap x5 of one mm will be 118.5 N which is well within the tolerance of plus or minus 20 Nm. While it is possible to set the force-reducing gap from the position x1, in practice measuring errors, friction and wear may mean that it is difficult to ensure that the preload force of, for example 120 N, which is used to determine the position x1 actually corresponds to the position where the mutually-facing surfaces of the ball nut and preload plunger are in direct contact with each other. Using as the start position for the force reducing distance L the position x2 where the measured force is so high that it could only be achieved when the mutually-facing surfaces of the ball nut and preload plunger are in direct contact with each other, while at the same time the measured force is sufficiently low that the linear movement necessary to achieve it is less than one millimeter, ensures that once the ball nut is retracted the distance L (which as mentioned above is preferably between 2 mm and 5 mm) there will always be a force-reducing gap x5. Distance L should preferably be adapted to take into account the estimated distance between x1 and x2 which is itself dependent on the magnitude of the value chosen for Fmon—as Fmon increases then, in order to maintain the same distance x5, L should also increase.

In a further embodiment of the present invention for software for a clutch actuator the width x5 of the force-reducing gap is controlled by the software to be a predetermined distance which is equal to or greater than a first predetermined distance and equal to or less than a second predetermined distance which is a proportion of the distance Δx3-2 i.e. the stroke of the clutch operating mechanism between the normal engaged position with the nominal preload force and fully disengaged clutch positions. Preferably the width x5 of force-reducing gap 61 is equal to or greater than 0.5 mm and equal to or less than 30% of the stroke of the clutch operating mechanism between engaged with the nominal preload force and fully disengaged clutch positions. More preferably the width x5 of force-reducing gap 61 is equal to or greater than 0.75 mm and equal to or less than 20% of the stroke of the clutch operating mechanism between engaged with the nominal preload force and fully disengaged clutch positions. Most preferably width x5 is equal to or greater than 1 mm and equal to or less than equal to or less than 15% of the stroke of the clutch operating mechanism between engaged with the nominal preload force and fully disengaged clutch positions.

In this way, in the clutch engaged position with the nominal preload force, the only path available for the transmission of vibrational forces between the clutch operating system and clutch actuator and vice versa is through the preload spring. As long as the amplitude of the vibration is less than the width of the gap x5, then the maximum additional force transmitted to the ball nut is the given by the width of the force-reducing gap x5 multiplied by the spring constant of the preload spring, thus if the gap x5 is 1 mm then if the amplitude of the vibration is 0.5 mm the additional force will be 0.75 N. If the force-reducing gap 61 was not there, then the additional force would have been 0.5 mm multiplied by the spring constant of the clutch operating mechanism, for example 500 N/mm which would have given a force of 250 N.

In a further embodiment of the present invention the clutch operating unit, e.g. a pushrod, and the preload plunger are both arranged concentric with the ball screw and each other. In this case the pushrod may be hollow and the centre of the preload plunger open to allow the ball screw to enter into the pushrod if necessary as the clutch wears. Such an arrangement would be longer than, but narrower than, the previously described embodiment of the invention. While the invention has been illustrated by an example in which the clutch operating unit of the clutch is a pushrod, the invention is applicable to all clutch actuators with a mechanical force transmission path between actuator unit and clutch operating unit independently of how the clutch operating unit of the clutch is constructed.

The present invention for reducing the transmission of forces though a clutch system when the clutch is engaged may be applied to any suitable clutch system and such a clutch system may be used on vehicles or machinery.

The above description of the present disclosure is provided for the purpose of illustration, and it would be understood by those skilled in the art that various changes and modifications may be made without changing the concept and essential features of the present disclosure. Thus, it is clear that the above-described embodiments are illustrative in all aspects and do not limit the present disclosure.

The scope of the present disclosure is defined by the following claims rather than by the detailed description of the embodiment. It shall be understood that all modifications and embodiments conceived from the meaning and scope of the claims and their equivalents are included in the scope of the present disclosure.

The invention claimed is:

1. Clutch actuator for operating a clutch wherein said actuator comprises:
    a preload plunger movable from a clutch-engaged position (x1) for exerting a preload onto a clutch operating pushrod (49) to a clutch-disengaging position (x3) and movable back from the clutch-disengaging position (x3) to the clutch-engaged position (x1);
    a movable body (17) movable into contact with said preload plunger (19) for moving said preload plunger to and from the clutch-engaged position to the clutch-disengaging position; and,
    a preload spring (21) connecting said movable body to said preload plunger wherein said preload spring is adapted to exert a preload on said preload plunger,
    wherein when said preload plunger is in the clutch-engaged position, said movable body is spaced from said preload plunger by a force-reducing gap (61) in order to reduce the transmission of force to said actuator when said preload plunger is in the clutch-engaged position.

2. Clutch actuator according to claim 1, wherein when said preload plunger is in the clutch-disengaging position said movable body is in direct contact with said preload plunger, and/or said preload spring is fully compressed and in contact with both said movable body and said preload plunger.

3. Clutch actuator according to claim 1, wherein a width (x5) of the force-reducing gap (61) is equal to or greater than 0.5 mm and equal to or less than 5 mm.

4. Clutch actuator according to claim 3 wherein the width (x5) of the force-reducing gap (61) is equal to or greater than 0.75 mm and equal to or less than 2.5 mm.

5. Clutch actuator according to claim 3 wherein the width (x5) of the force-reducing gap (61) is equal to or greater than 1 mm and equal to or less than 2 mm.

6. Clutch actuator according to claim 1 wherein the width (x5) of the force-reducing gap (61) is equal to or greater than 0.5 mm and equal to or less than 30% of a stroke of the clutch between the clutch-engaged position and the clutch disengaged position.

7. Clutch actuator according to claim 1, wherein a spring constant of said preload spring is equal to or less than 5 N/mm.

8. Clutch system comprising a clutch and a clutch actuator for operating said clutch, wherein said clutch actuator comprises:
    a preload plunger movable from a clutch-engaged position (x1) for exerting a preload onto a clutch operating pushrod (49) to a clutch-disengaging position (x3) and movable back from the clutch-disengaging position (x3) to the clutch-engaged position (x1);
    a movable body (17) movable into contact with said preload plunger (19) for moving said preload plunger to and from the clutch-engaged position to the clutch-disengaging position; and,
    a preload spring (21) connecting said movable body to said preload plunger wherein said preload spring is adapted to exert a preload on said preload plunger; and,
    wherein when said preload plunger is in the clutch-engaged position, said movable body is spaced from said preload plunger by a force-reducing gap (61) in order to reduce the transmission of force to said clutch actuator when said preload plunger is in the clutch-engaged position.

9. Clutch system according to claim 8 wherein when said preload plunger is in the clutch-disengaging position said movable body is in direct contact with said preload plunger, and/or said preload spring is fully compressed and in contact with both said movable body and said preload plunger.

10. Clutch system according to claim 8 wherein a width (x5) of the force-reducing gap (61) is equal to or greater than 0.5 mm and equal to or less than 5 mm.

11. Clutch system according to claim 8 wherein a width (x5) of the force-reducing gap (61) is equal to or greater than 0.5 mm and equal to or less than 30% of a stroke of the clutch between the clutch-engaged position and the clutch disengaged position.

12. Clutch system according to of claim 8 wherein a spring constant of said preload spring is equal to or less than 5 N/mm.

13. Method for operating an actuator in a clutch system comprising the steps of:
   i) providing the clutch system with an actuator wherein said actuator comprises:
      a preload plunger movable from a clutch-engaged position (x1) for exerting a preload onto a clutch operating pushrod (49) to a clutch-disengaging position (x3) and movable back from the clutch-disengaging position (x3) to the clutch-engaged position (x1);
      a movable body (17) movable into contact with said preload plunger (19) for moving said preload plunger to and from the clutch-engaged position to the clutch-disengaging position; and,
      a preload spring (21) connecting said movable body to said preload plunger wherein said preload spring is adapted to exert a preload on said preload plunger;
      wherein when said preload plunger is in the clutch-engaged position, said movable body is spaced from said preload plunger by a force-reducing gap (61) in order to reduce the transmission of force to said actuator when said preload plunger is in the clutch-engaged position;
   ii) determining if said preload plunger is in the clutch-engaged position and, if said preload plunger is determined to be in the clutch-engaged position, moving said movable body away from said preload plunger so that there is a force-reducing gap (61) between said preload plunger and said movable body.

14. Method for operating an actuator for operating a clutch system comprising the steps of:
   providing a preload plunger movable to and from a clutch-engaged position (x1) and a clutch-disengaging position (x3);
   providing a movable body (17) movable into contact with said preload plunger (19) for moving said preload plunger to and from the clutch-engaged position and the clutch-disengaging position; and,
   providing a preload spring (21) connecting said movable body to said preload plunger wherein said preload spring is adapted to exert a preload on said preload plunger; and,
   controlling the movement of said movable body so that when said preload plunger is in the clutch-engaged position, said movable body is spaced from said preload plunger by a force-reducing gap (61) in order to reduce the transmission of force to the actuator when it is in the clutch-engaged position;
   determining if said preload plunger is in the clutch-engaged position and, if said preload plunger is determined to be in the clutch-engaged position, moving said movable body away from said preload plunger so that there is the force-reducing gap (61) between said preload plunger and said movable body.

15. Method according to claim 14 further comprising the step of controlling the movement of said movable body so that when said preload plunger is in the clutch-disengaging position, said movable body is in direct contact with said preload plunger, and/or said preload spring is fully compressed and in contact with both said movable body and said preload plunger.

16. Method according to claim 13 further comprising the step of controlling the movement of said movable body so that a width (x5) of the force-reducing gap (61) is equal to or greater than 0.5 mm and equal to or less than 5 mm.

17. Method according to claim 13 further comprising the step of controlling the movement of said movable body so that a width (x5) of the force-reducing gap (61) is equal to or greater than 0.5 mm and equal to or less than 30% a stroke of the clutch between the clutch-engaged position and the clutch disengaged position.

* * * * *

UNITED STATES PATENT AND TRADEMARK OFFICE
CERTIFICATE OF CORRECTION

PATENT NO. : 10,844,912 B2  
APPLICATION NO. : 16/072609  
DATED : November 24, 2020  
INVENTOR(S) : Geir Brudeli et al.

Page 1 of 1

It is certified that error appears in the above-identified patent and that said Letters Patent is hereby corrected as shown below:

On the Title Page

Item (72) Inventor section: please replace city name "Førenskog" with --Lørenskog--

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*